United States Patent Office 3,835,088
Patented Sept. 10, 1974

3,835,088
MgO-CONTAINING RESIN COMPOSITION AS THICKENING AGENT
Youichi Takamiya, Saitama, Kiichiro Sasaguri, Tokyo, Hiroshi Sano and Katsumi Okina, Fukushima, and Sunao Kawachi, Saitama, Japan, assignors to Shin Nihon Kagaku Kogyo Kabushiki Kaisha, Osaka, Japan
Filed Jan. 18, 1973, Ser. No. 324,707
Claims priority, application Japan, Jan. 18, 1972, 47/6,645
Int. Cl. C08f 45/28; C08g 51/28
U.S. Cl. 260—33.6 UA                         14 Claims

ABSTRACT OF THE DISCLOSURE

A slurry-like, dope-like, or paste-like resin composition for increasing the viscosity of unsaturated polyester resins showing improved thickening properties comprising (a) magnesium oxide having an iodine number of 10–50 mg./g. and/or magnesium hydroxide having an iodine number of 5–50 mg./g., (b) a liquid monomer having polymerizable double bonds, and (c) a thermoplastic addition polymer soluble in the above monomer or (d) a thermoplastic condensation polymer soluble in the above monomer.

BACKGROUND OF THE INVENTION

1. Field of the Invention

Figure 2:
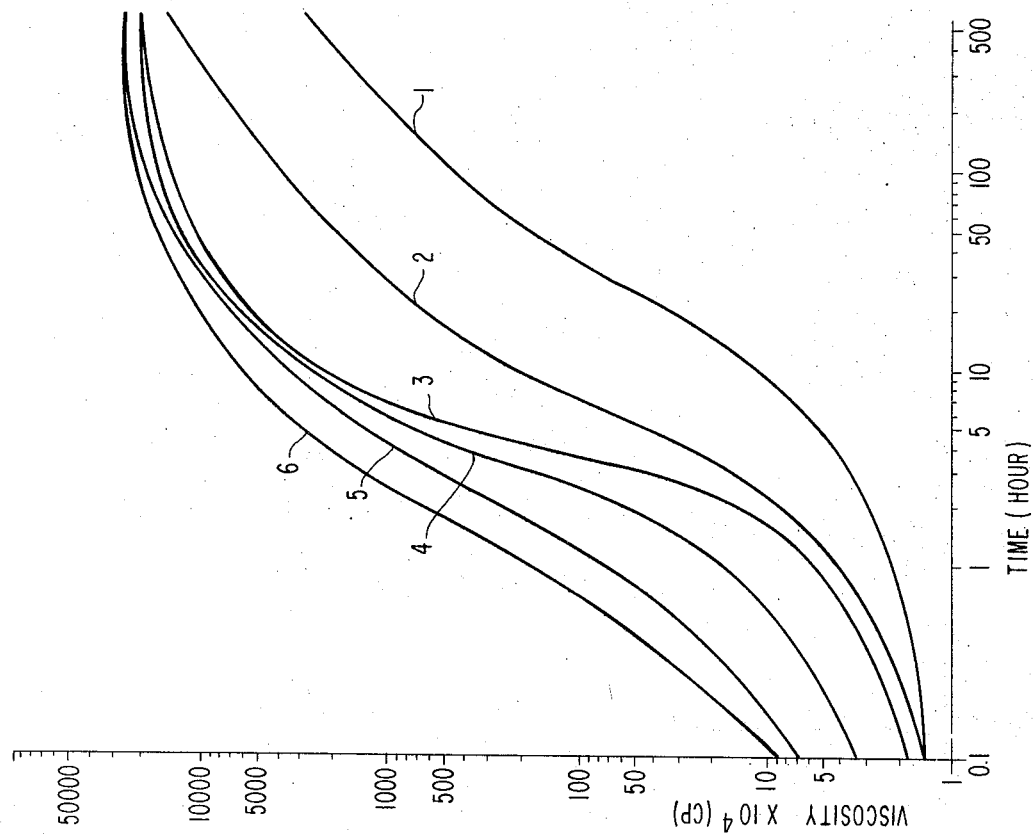

The present invention relates to a novel resin composition useful as a thickening agent and more particularly the invention relates to a resin composition containing magnesium oxide and/or magnesium hydroxide useful for increasing the viscosity of unsaturated polyester resins by being incorporated therein.

2. Description of the Prior Art

It is known that materials for various utensils, parts of motorcars, boats, etc., are produced using unsaturated polyester resins as the main materials by a molding method such as sheet molding compound (S.M.C.) and bulk molding compound (B.M.C.). Also, it is known to add various viscosity increasing agents to the unsaturated polyester resin compositions to be molded by a molding method such as S.M.C. and B.M.C. for reducing the stickiness of the unsaturated polyester resin composition and for making uniform the flow of the composition at molding.

The viscosity of an unsaturated polyester resin composition containing reinforcing fibers such as glass fibers is required to increase over a slow thickening period at the beginning of the thickening step for wetting out well the reinforcing fibers with the unsaturated polyester resin. The period required for wetting out well the reinforcing fibers with the resin depends upon the kind of the apparatus to be employed for preparing the resin composition such as S.M.C. or B.M.C. but is generally from five minutes to one hour. It is desirable that after wetting out the reinforcing fibers with the resin, the viscosity of the resin should increase rapidly to reach an equilibrium and thereafter the resin be maintained at a constant viscosity for a long period of time.

Now, it is well known that magnesium oxide, magnesium hydroxide, or a mixture thereof can be used as a thickening agent for an unsaturated polyester resin composition. The ideal viscosity-time curve of an unsaturated polyester resin containing magnesium oxide, magnesium hydroxide or a mixture thereof as a thickening agent is that the thickening rate at the initial stage of viscosity increase be slow but after wetting out well reinforcing fibers in the unsaturated polyester resin with the resin, the viscosity of the resin should increase rapidly as shown in Curve (1) of FIG. 1 of the accompanying drawings although such a curve is not real. However, when magnesium oxide and/or magnesium hydroxide having a high iodine number is incorporated in the unsaturated polyester resin composition, the initial thickening rate is high, which permits insufficient wetting out of the reinforcing fibers with the resin as shown in Curve (2) of FIG. 1. On the other hand, when magnesium oxide and/or magnesium hydroxide having a low iodine number is incorporated in the unsaturated polyester resin composition, the initial thickening rate is low and thus the reinforcing fibers are wetted out sufficiently with the resin, but the period of time required for gaining the equilibrium viscosity is too long as shown in Curve (3) of FIG. 1, and, therefore, the use of magnesium oxide and/or magnesium hydroxide having low iodine numbers is disadvantageous in industry.

Also, it has been widely practiced at present to incorporate a powder of magnesium oxide, magnesium hydroxide or a mixture thereof in liquid unsaturated polyester resin compositions but such a technique is accompanied by the following difficulties:

(1) Magnesium oxide and/or magnesium hydroxide is greatly denatured by moisture or carbon dioxide in air.

(2) It is difficult to disperse uniformly the additive into the unsaturated polyester resin composition.

(3) Because magnesium oxide and/or magnesium hydroxide, in particular magnesium oxide has a strong tendency of sticking to the inside wall of equipment, it is difficult to feed constantly a definite amount of it to them.

(4) In order to conduct sufficiently the wetting out procedure and to obtain a sufficient thickening effect, it has been proposed to use a combination of some types of magnesium oxides, however it is technically difficult even by such a method to satisfy both of the sufficient wetting out period of time and the rapid thickening after wetting out of the reinforcing fibers.

Various attempts have hitherto been made for overcoming the aforesaid difficulties accompanied by the conventional use of magnesium oxide and/or magnesium hydroxide. For example, in the specification of U.S. Pat. No. 3,609,117 is described a method of using magnesium oxide having an iodine number higher than 100 milliequivalent/100 g. (127 mg./g.) and grain sizes of 0.1–7 microns for improving the thickening property of the magnesium oxide. Furthermore, for overcoming the above-indicated difficulties (1), (2), and (3) accompanied by the use of the powder, a liquid product prepared by suspending the powder of magnesium oxide in a specific unsaturated polyester resin having no carboxylic group at the terminal group is marketed by W. R. Grace Company under the trade name of Modifier-M (see, Journal of Polymer Science; Part A–1, Vol. 9, 2234-(1971)). In other commercially available thickening compositions sold by P.P.G. Industries Co. under the trade name of Selectron 5988 (Catalog of the company, August 1971), the powder of magnesium oxide is dispersed in an unsaturated polyester resin of a low acid value for improving the denaturation prevention and the uniform dispersion of magnesium oxide.

Also, U.S. Pat. No. 3,609,117 discloses the use of magnesium oxide which has previously been dispersed in an inert vehicle such as a plasticizer.

However, in spite of the various attempts as described above, a composition of magnesium oxide, magnesium hydroxide, or a mixture thereof suitable as a thickening agent for unsaturated polyester resin compositions unaccompanied by the aforesaid difficulties has not yet been obtained.

SUMMARY OF THE INVENTION

The primary object of this invention is to provide a magnesium oxide- or magnesium hydroxide-containing composition for increasing the viscosity of liquid unsaturated polyester resin compositions showing improved and satisfactory thickening properties.

Another object of this invention is, therefore, to provide a thickening composition for liquid unsaturated polyester resin compositions unaccompanied by the aforesaid difficulties.

That is, according to the present invention, there is provided a slurry-like, dope-like, or paste-like resin composition as a thickening agent comprising (a) 15–200 parts by weight of magnesium oxide having an iodine number of 10–50 mg./g. and/or magnesium hydroxide having an iodine number of 5–50 mg./g., (b) 100 parts by weight of a liquid monomer having polymerizable double bonds, and (c) 1 to 100 parts by weight of a thermoplastic addition polymer soluble in the monomer or (d) 20 to 300 parts by weight of a thermoplastic condensation polymer soluble in the monomer.

BRIEF DESCRIPTION OF THE ACCOMPANYING DRAWINGS

FIGS. 1 to 9 show the curves indicating the relationship between viscosity and time measured for various compositions. In each curve, the viscosity is shown in the ordinate in terms of centipoise $\times 10^4$ and the time is shown in the abscissa in terms of hours.

DETAILED DESCRIPTION OF THE INVENTION

First, the features of the present invention (1) that the resin composition of this invention is a slurry-like, dope-like or paste-like composition prepared by dissolving a specific resin and a specific solvent and then dispersing densely magnesium oxide, magnesium hydroxide, or a mixture thereof in the mixture and (2) that the resin composition of this invention is a slurry, dope, or paste allow, the difficulties which accompany the conventional use of magnesium oxide or magnesium hydroxide to be overcome.

That is, (i) the resin composition of this invention has a remarkable effect of preventing the reaction of moisture and carbon dioxide in air, (ii) the resin composition of this invention can easily be dispersed uniformly in a liquid unsaturated polyester resin composition, and (iii) the composition can be fed easily and accurately by using a pump or screw conveyer.

However, the features of the resin composition of this invention are not limited to the above-mentioned feature. That is, more important features of the resin composition of this invention are as follows: When the resin composition of this invention is used as a thickening agent for a liquid unsaturated polyester resin containing reinforcing fibers therein, the thickening rate of the resin during the initial wetting out period of the fibers with the resin can be maintained fairly low and further after completing the wetting out, a rapid thickening rate can be obtained. In the resin composition of this invention, the initial wetting out period of the fibers with the resin can be controlled desirably in a period of from five minutes to one hour by changing the activity of magnesium oxide and/or magnesium hydroxide. Thus, contrary to the conventional understanding about magnesium oxide that magnesium oxide having a higher iodine number is more preferable since in such case the thickening rate is high and thus the system reaches quickly the equilibrium state in regard to the viscosity, it becomes possible by using magnesium oxide and/or magnesium hydroxide having a low iodine number according to this invention to maintain a fairly low thickening rate during the initial wetting out period and thereafter to obtain a rapid thickening rate, which has hitherto been considered to be possible in case of using magnesium oxide having only a high iodine number.

That is, the inventors have discovered the surprising fact that in the resin composition of this invention, magnesium oxide or magnesium hydroxide each having a low iodine number, or a mixture thereof can be preferably uesd for controlling accurately the wetting out period of reinforcing fibers in a liquid unsaturated polyester resin composition and the thickening rate of the resin composition after finishing the wetting out of the fibers.

Moreover, for preventing the denaturation of magnesium oxide, dispersing it uniformly, and feeding stably, a method has hitherto been proposed in which magnesium oxide having a high iodine number is dispersed in a liquid unsaturated polyester resin having a low acid value, e.g., an acid value below 20. However, the method is accompanied with such unsatisfactory faults that the method requires a specific resin, i.e., an unsaturated polyester having a low acid value, it is required to add a material such as calcium carbonate for preventing magnesium oxide from settling, and also even if an unsaturated polyester resin having an acid value below 20 is used, the resin also has a property of increasing its viscosity and thus the resin composition having dispersed therein magnesium oxide can not be stored stably for a long period of time.

On the other hand, because in the resin composition of this invention, a thermoplastic polymer contained in a low profile unsaturated polyester resin composition is used as a resin component of the resin composition, the use of a specific resin, i.e., an unsaturated polyester resin having a low acid value is unnecessary and further the addition of material such as calcium carbonate for preventing the settling of magnesium oxide is also unnecessary. Moreover, because the thermoplastic polymer to be used in this invention does not increase its viscosity by the addition of magnesium oxide, magnesium hydroxide or a mixture thereof, the resin composition of this invention can be stored stably for a long period of time. If necessary, a stabilizer for the monomer having polymerizable double bonds such as sulfur, hydroquinone, methyl hydroquinone, etc. may be added to the resin composition of this invention. The above-described merits of this invention have never been obtained by conventional methods.

Practically, the resin composition of this invention is a slurry-like, dope-like, or paste-like resin composition comprising (a) 15–200 parts by weight of magnesium oxide having an iodine number of 10–50 mg./g., magnesium hydroxide having an iodine number of 5–50 mg./g., or a mixture thereof, (b) 100 parts by weight of a liquid monomer having polymerizable double bonds, and (c) 1 to 100 parts by weight of a thermoplastic addition polymer soluble in the monomer or (d) 20 to 300 parts by weight of a thermoplastic condensation polymer soluble in the monomer.

The iodine number of magnesium oxide in this invention is the value obtained by the method described in JIS K–6221, that is, the value of the adsorbed amount of iodine per one gram of dry sample expressed by the number of milligram. The iodine number of magnesium hydroxide is also evaluated by the same manner as in magnesium oxide. If the iodine number of magnesium oxide is less than 10 mg./g. or the iodine number of magnesium hydroxide is less than 5 mg./g., the resin composition of this invention containing such a magnesium compound does not show a desired thickening effect even if the resin composition is added to a liquid unsaturated polyester resin composition. On the other hand, if the iodine number of magnesium oxide or magnesium hydroxide is higher than 50 mg./g., the thickening rate becomes too high and thus sufficient initial wetting out period of reinforcing fibers cannot be obtained. In other words, if the iodine number of magnesium oxide or magnesium hydroxide is outside the scope of this invention, a desired viscosity-time characteristic curve cannot be obtained. Accordingly, it is necessary in this invention that the iodine number of magnesium oxide be 10–50 mg./g., preferably 25–40 mg./g. and the iodine number of magnesium hydroxide be 5–50 mg./g., preferably 10–30 mg./g.

The purity of magnesium oxide, magnesium hydroxide, or a mixture thereof to be used in this invention is desirably that the content of magnesium oxide in the composition from which the ignition loss has been subtracted be more than 90%. Also, in case of using magnesium oxide and magnesium hydroxide, they may be used in any mixing ratio.

The term "unsaturated polyester resin composition" in this specification means a resin composition to be employed by a molding method such as S.M.C., B.M.C., etc., that is, a composition mainly containing an unsaturated polyester resin as the main component together with reinforcing fibers, fillers, and solvents. If necessary, the resin composition may contain further a thermoplastic polymer, a catalyst, a mold lubricant, etc.

The term "unsaturated polyester resin" in this invention can mean various condensation products obtained from the following raw material components;

(1) propylene glycol and maleic acid or fumaric acid,
(2) propylene glycol and phthalic acid or isophthalic acid or fumaric acid,
(3) 1,3-butanediol and maleic ocid or fumaric acid,
(4) 1,3-butanediol and maleic acid, or fumaric acid and phthalic acid or iso-phthalic acid,
(5) ethylene glycol (less than 50 mol percent, propylene glycol, and maleic acid or fumaric acid,
(6) ethylene glycol (less than 50 mol percent); propylene glycol; maleic acid or fumaric acid; and phthalic acid or isophthalic acid,
(7) propylene glycol, dipropylene glycol (less than 50 mol percent), and maleic acid or fumaric acid,
(8) propylene glycol; dipropylene glycol (less than 50 mol percent); maleic acid or fumaric acid; and phthalic acid or isophthalic acid,
(9) diethylene glycol and maleic acid or fumaric acid,
(10) diethyl glycol and maleic acid or fumaric acid; and phthalic acid or isophthalic acid.

The above examples are simple illustrations of the suitable polyester resins and thus the polyester resins used in this invention shall not be limited to them.

As reinforcing fibers to be incorporated in the unsaturated polyester resin composition, there are illustrated chopped strand-form glass fibers, chopped strand matform glass fibers, synthetic single fibers of vinylon or nylon, and such specific fibers as carbon fibers, asbestos, and metallic fibers. Also, as the fillers to be incorporated in the unsaturated polyester resin composition, there are illustrated clay, talc, silica, calcium carbonate, calcium silicate, hydrated alumina, etc.

Also, examples of the thermoplastic addition polymers (polymerized by addition polymerization) to be used in the resin composition of this invention includes a homopolymer of methyl methacrylate, ethyl methacrylate, butyl methacrylate, methyl acrylate, ethyl acrylate, styrene, or vinyl toluene; a copolymer of methyl methacrylate and a lower alkyl ester of acrylic acid or methacrylic acid; and a copolymer of methyl methacrylate and at least one of the following monomers, i.e., lauryl methacrylate, isobornyl methacrylate, acrylamide, hydroxyethyl methacrylate, styrene, 2-ethylhexyl acrylate, acrylonitrile, methacrylic acid, methacrylamide, methylol acrylamide, and cetylstearyl methacrylate. Also, other useful examples of the thermoplastic addition polymers to be used in the resin composition of this invention are a styrene-acrylonitrile copolymer, a vinyl chloride-vinyl acetate copolymer, cellulose acetate butyrate, and cellulose acetate propionate.

It is a necessary condition in this invention that the thermoplastic addition polymer to be used in this invention be soluble in the liquid monomer having polymerizable double bonds, which is the third component of the resin composition of this invention. Furthermore, it is preferable that the molecular weight of the thermoplastic addition polymer be in the range of from 10,000 to 10,000,000 and the particularly preferable molecular weight range of the thermoplastic addition polymer for increasing the content of magnesium oxide and/or magnesium hydroxide while maintaining the viscosity of the resin composition at a proper value is from 25,000 to 500,000.

Examples of the thermoplastic condensation polymers (polymerized by condensation polymerization) soluble in the liquid monomer having polymerizable double bonds which can be used in the resin composition of this invention includes saturated polyester resins produced by the condensation polymerization of a dibasic acid and a dihydric alcohol. Suitable examples of the dibasic acid used in preparing the saturated polyesters are oxalic acid, succinic acid, adipic acid, sebacic acid, phthalic acid, isophthalic acid, hexahydrophthalic acid, p-hydroxybenzoic acid, benzene-1,4-diacetic acid, naphthalene-2,6-dicarboxylic acid, 3-hydroxy-2,2-dimethylpropionic acid and the like. Suitable examples of the dihydric alcohol used in preparing the saturated polyesters are ethylene glycol, propylene glycol, 1,4-butanediol, neopentyl glycol, diethylene glycol, triethylene glycol, hydroquinone, 1,4-hydroxymethylbenzene and the like. A combination of isophthalic acid as a dibasic acid, and diethylene glycol and neopentyl glycol as dihydric alcohols is particularly preferred. It is desirable that the saturated polyesters have an acid value of from 0.5 to 5, preferably from 1 to 3. It is also desirable that the thermoplastic condensation polymers have a molecular weight in the range of from 1,000 to 50,000, preferably from 5,000 to 30,000.

The proportion of the liquid monomer having polymerizable double bonds and the thermoplastic polymer is an important factor affecting the stability of the resin composition as a thickening agent according to the present invention. The thermoplastic addition polymer is used in a proportion of from 1 to 100 parts by weight, preferably from 30 to 60 parts by weight, per 100 parts by weight of the liquid monomer recited herein and the thermoplastic condensation polymer is used in a proportion of from 20 to 300 parts by weight, preferably, from 40 to 250 parts by weight, per 100 parts by weight of the monomer. The mixture of the liquid monomer having polymerizable double bonds and the thermoplastic polymer in the proportion described above generally possesses a viscosity in the range of from 5 to 1,000 poise and the final resin composition obtained from the mixture having a viscosity in the above range has been found to have an excellent stability.

Also, examples of the liquid monomer having polymerizable double bonds to be employed in the resin composition of this invention are monomers each having at least one polymerizable reactive group,

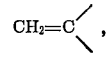

such as styrene, vinyltoluene, divinylbenzene, vinylethyl benzene, α-methylstyrene, α-ethylstyrene, diallyl phthalate, chlorostyrene, t-butylstyrene, and a mixture thereof. The liquid monomer may contain a small amount (less than 50% by weight) of a lower alkyl ester of acrylic acid or methacrylic acid, 1,3-butanediol dimethacrylate, and the like.

The mixing of magnesium oxide, magnesium hydroxide or a mixture thereof, the liquid monomer having polymerizable double bonds, and the thermoplastic polymer may be conducted by means of an ordinary mixer such as ball mill, mortar grinders, colloid mill, etc. When a dispersing agent such as a conventionally used surface active agent is added to the mixture upon mixing the components, the dispersion of magnesium oxide, magnesium hydroxide or a mixture thereof in the system takes place easily and further the content of magnesium oxide, magnesium hydroxide or a mixture thereof can be increased. However, by properly selecting the types and the mixing ratio of the thermoplastic polymer and the liquid monomer having polymerizable double bonds, magnesium oxide, magnesium hydroxide or a mixture thereof can be easily dispersed in the composition in a concentration above 60% by weight and thus at the practice of this invention, the addition of such a surface active agent as described above is not always necessary.

If the content of magnesium oxide, magnesium hydroxide or a mixture thereof in the resin composition of this invention is too high, the viscosity of the resin composition becomes higher and the resin composition obtained is not in the slurry state, dope state or paste state. On the other hand, the lower the content of the magnesium compound, the larger the amount of the resin composition of this invention to be added to the liquid unsaturated polyester resin composition, which makes the use of the resin composition practically rather disadvantageous. Thus, the content of magnesium oxide, magnesium hydroxide or a mixture thereof suitable for the objects of this invention is 15–200 parts by weight per 100 parts by weight of the liquid monomer having polymerizable double bonds.

The resin composition of this invention may be quite easily and uniformly dispersed in the unsaturated polyester resin composition by using a mixer such as a high-speed high-shear mixer. In the case of producing continuously S.M.C. sheets by means of a S.M.C. machine, the unsaturated polyester resin composition prepared by blending an unsaturated polyester, a calcium carbonate filler, and other additives may be fed as a mixture thereof and the resin composition of this invention or the unsaturated polyester resin composition as above may be fed continuously together with the resin composition of this invention. In the both cases the resin composition of this invention can be fed easily and quantitatively to the mixer. In particular, in the case of feeding continuously the resin composition of this invention together with the unsaturated polyester resin composition, the resin composition of this invention can be fed stably by means of a pump or metering pump and mixed thoroughly due to the fact that the resin composition of this invention is in a slurry, dope or paste state.

Figure 1:
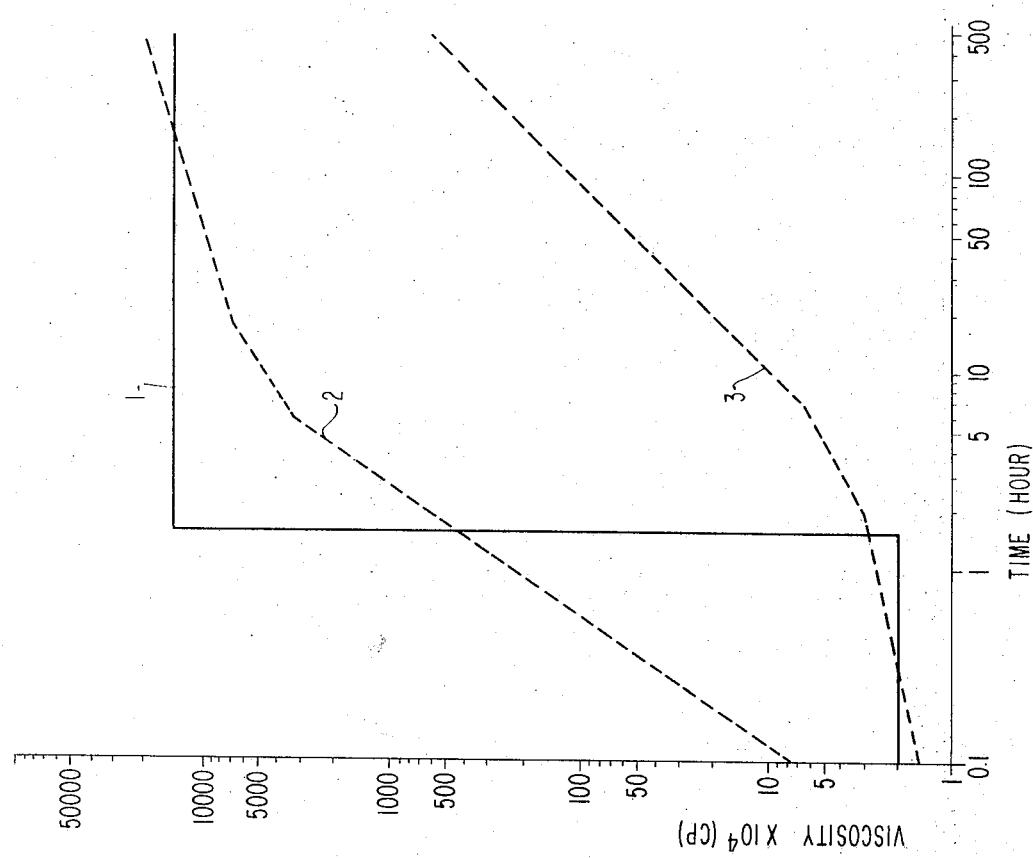

Now, the ideal thickening curve is shown in Curve (1) of FIG. 1 of the accompanying drawings as referred to before but in fact, the unsaturated polyester resin composition to be used in a S.M.C. or B.M.C. molding method is required to satisfy the viscosity factors that the viscosity of the resin composition in the initial wetting out period of from 5 minutes to one hour must be lower than 50,000 centpoise but after that period, the viscosity must increase rapidly to reach equilibrium at about 10,000,000 centipoise to 100,000,000 centipoise.

Figure 3:
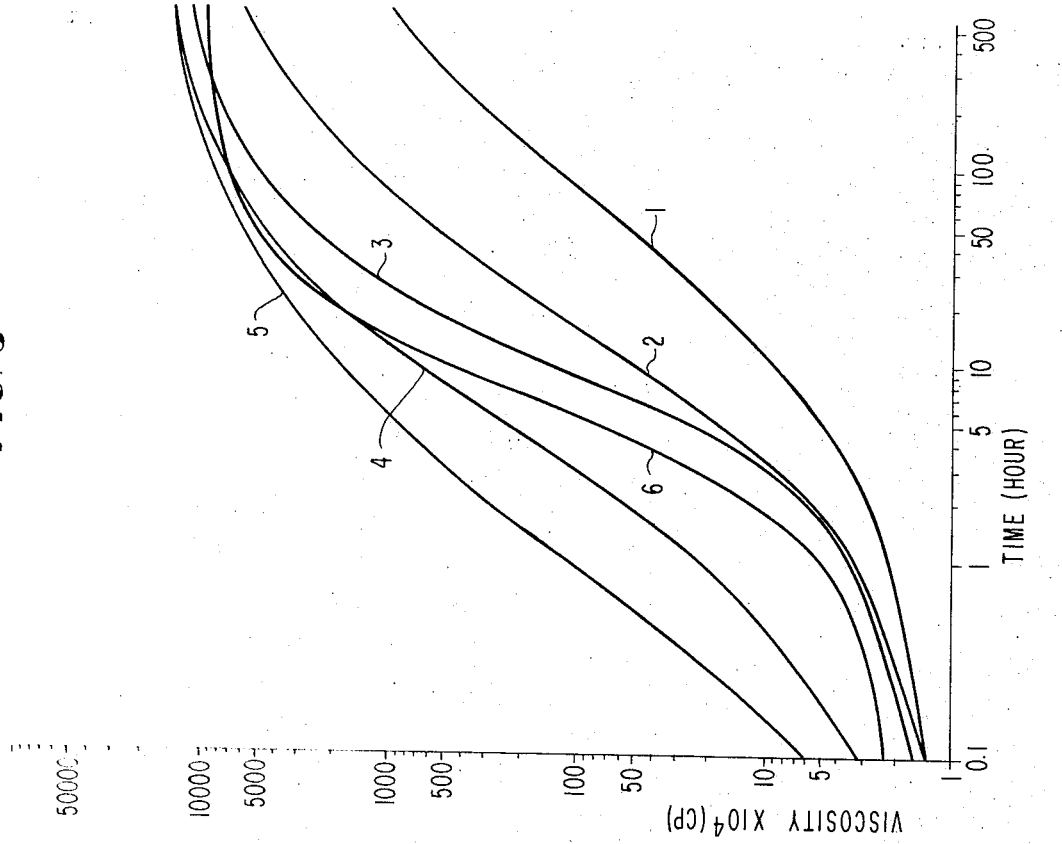

As shown in FIG. 2 and FIG. 3 of the accompanying drawings, the resin composition of this invention gives proper wetting out periods in the iodine number range of 10–50 mg./g. for magnesium oxide and in the iodine number range of 5–50 mg./g. for magnesium hydroxide and after the initial wetting out period, increases rapidly the viscosity of the unsaturated polyester resin composition. The period of time required for reaching the equilibrium of viscosity is shorter as the iodine number of the magnesium compound is higher but the equilibrum viscosity of the system depends mainly on the content of magnesium oxide or magnesium hydroxide but scarcely depends upon the iodine number of the magnesium compound.

Figure 4:
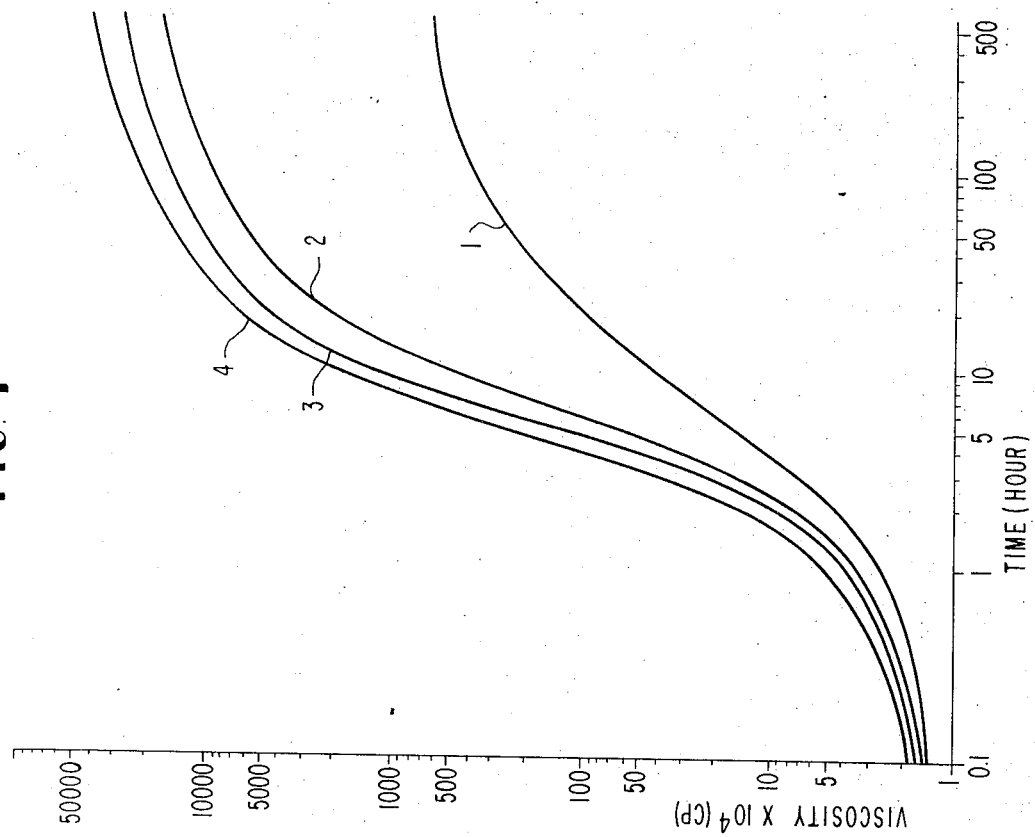
Figure 5:
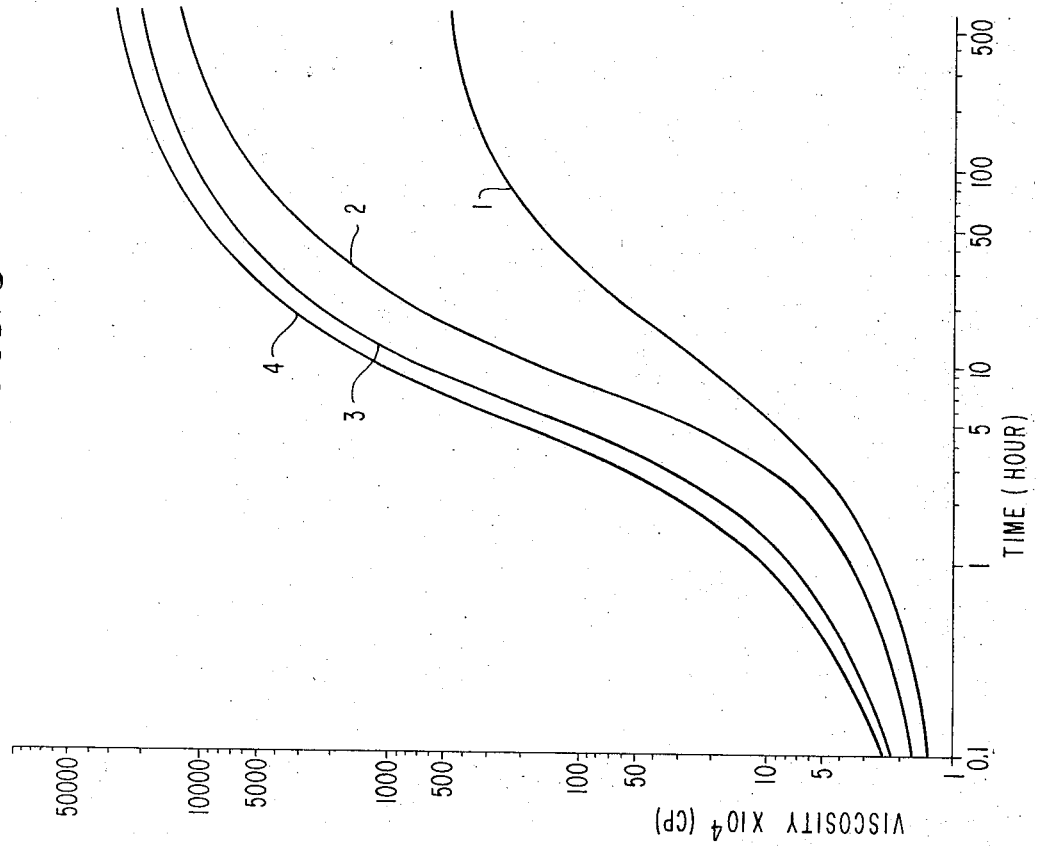

FIG. 4 and FIG. 5 show the reactions between the addition amounts of the resin compositions of this invention and the thickening curves. That is, by increasing the amount of the resin composition of this invention to be added, the equilibrium viscosity becomes higher and at the same time the initial wetting out period becomes shorter. Accordingly, in the case of using practically the resin composition of this invention, the resin composition having a suitable iodine number may be selected according to the viscosity conditions such as the thickening rate and the initial wetting out period.

The invention will be further explained by the following examples.

Example 1

(A) a thermoplastic copolymer of 86 parts by weight of methyl methacrylate and 14 parts by weight of ethyl acrylate having a molecular weight of about 140,000, (B) styrene, (C) magnesium oxide having an iodine number of 28 mg./g., and (D) magnesium hydroxide having an iodine number of 17 mg./g. were mixed in a colloid mill in the mixing ratios shown in the following table and the viscosity and the state of each resin composition thus prepared are also shown in the table.

TABLE

| Experiment number | 1 | 2 | 3 | 4 | 5 | 6 |
|---|---|---|---|---|---|---|
| A (part) | 50 | 100 | 30 | 100 | 50 | 1 |
| B (part) | 100 | 100 | 100 | 100 | 100 | 100 |
| C (part) | 50 | 130 | 200 | 0 | 0 | 0 |
| D (part) | 0 | 0 | 0 | 15 | 100 | 110 |
| Viscosity (25° C.) poise | 60 | 210 | 380 | 14 | 38 | 9,400 |
| Condition of resin composition | (a) | (b) | (b) | (b) | (b) | (c) |

NOTE.—(a) to (c) are the conditions of the resin compositions prepared above after placing for 30 days in a chamber at 25° C (a): Dope-like state. Precipitates were not formed. Supernatant liquid formed but vanished by gentle stirring;

(b) Dope-like state. Supernatant liquid and precipitates were not formed and the fluidity was good;

(c) The composition was in a paste state. Supernatant liquid and precipitates are not formed.

Example 2

To a solution of 100 parts by weight of a saturated polyester resin having a molecular weight of about 20,000 (acid value: 1.0) and composed of 45 mol percent isophthalic acid, 15 mol percent neopentyl glycol, and 40 mol percent diethylene glycol in 100 parts by weight of styrene was added 200 parts by weight of magnesium oxide having an iodine number of 5–130 mg./g. or magnesium hydroxide having an iodine number of 5–80 mg./g. and the mixture was mixed well for one hour in a ball mill, whereby a dope-like resin composition was obtained in each case.

For confirming the thickening effect of each of the resin compositions thus prepared, each composition was added to the unsaturated polyester resin composition having the following formulation and the thickening was observed.

Formulation of unsaturated polyester resin composition:

(a) 30 parts by weight of a resin prepared by dissolving 60 parts by weight of a saturated polyester resin having a molecular weight of about 20,000 and composed of 45 mol percent isophthalic acid, 15 mol percent neopentyl alcohol, and 40 mol percent diethylene glycol in 40 parts by weight of styrene;

(b) 70 parts by weight of a resin prepared by dissolving 60 parts by weight of an unsaturated polyester resin composed of 1 mole of propylene glycol, 0.6 mole of phthalic anhydride, and 0.4 mole of maleic anhydride in 40 parts by weight of styrene;

(c) 100 parts by weight of a fine powder of calcium carbonate (SS–80 made by Nitto Funka Kogyo K. K.).

The above components (a), (b), and (c) were mixed for 15 minutes in a shear mixer and then 2 parts by weight of the resin composition of this invention in case of using magnesium oxide or 6 parts by weight of the resin composition in case of using magnesium hydroxide was added to the mixture prepared above. After mixing further the resulting mixture for 5 minutes in a shear mixer, the mixture was placed in a glass bottle followed by sealing and the bottle was stored in a chamber at 25° C., whereby the variation of viscosity of the mixture was observed.

The measurement of the viscosity was conducted by means of a HBT-type rotary viscometer (made by Brookfield Co.). That is, the viscosity was measured by a disc type rotator at 5 r.p.m. up to 400,000 centipoise, by a reverse T-shaped rotator equipped with helipath stand at 5 r.p.m. in the range of from 400,000 to 10,000,000 centipoise, and then by the same rotator at 0.5 r.p.m. in the range of above 10,000,000 centipoise. The results are shown in FIG. 2 and FIG. 3 of the accompanying drawings.

In FIG. 2, Curve (1) stands for the result of the thickening test on the resin composition prepared by using magnesium oxide having an iodine number of 5 mg./g., Curve (2) stands for the case of using magnesium oxide having an iodine number of 12 mg./g., Curve (3) stands for the case of using magnesium oxide having an iodine number of 38 mg./g., Curve (4) stands for the case of using magnesium oxide having an iodine number of 52 mg./g., and Curve (6) stands for the case of using magnesium oxide having an iodine number of 130 mg./g.

Also, in FIG. 3, Curve (1) stands for the case of using magnesium hydroxide having an iodine number of 5 mg./g., Curve (2) stands for the case of using magnesium hydroxide having an iodine number of 12 mg./g., Curve (3) stands for the case of using magnesium hydroxide having an iodine number of 25 mg./g., Curve (4) stands for the case of using magnesium hydroxide having an iodine number of 40 mg./g., and Curve (5) stands for the case of using magnesium hydroxide having an iodine number of 82 mg./g. Also, Curve (6) in FIG. 3 stands for the case of using a mixture of magnesium oxide and magnesium hydroxide (1:1 by weight) having an iodine number of 34 mg./g.

FIG. 2 and FIG. 3 indicate that no significant difference in the equilibrium viscosity can be observed when the resin composition is used in the same amount. These figures also indicate that the higher the iodine number, the shorter the time required for reaching the equilibrium. When magnesium oxide or magnesium hydroxide having an iodine number greater than 50 mg./g. is used, the viscosity at the initial stage increases too rapidly to secure the time for sufficient initial wetting out. Conversely, when magnesium oxide or magnesium hydroxide having an excessively low iodine number, the time required for sufficient initial wetting out can be secured but a longer period of time would be required before reaching the equilibrium in viscosity. In the present invention, resin compositions having a thickening curve near the ideal curve shown in FIG. 1 can be obtained by using magnesium oxide having an iodine number of from 10 to 50 mg./g. or magnesium hydroxide having an iodine number of from 5 to 50 mg./g., or a mixture thereof.

Example 3

For confirming the influence of the amount of the resin composition of the present invention to be added on the thickening effect, the resin compositions prepared in Example 2 using magnesium oxide having an iodine number of 38 mg./g. and magnesium hydroxide having an iodine number of 25 mg./g. respectively were added to the unsaturated polyester resin composition each and then the thickening effect was observed in each case.

That is, 30 parts of the component(a), 70 parts of the component (b), and 100 parts of the component(c) for the formulation of the unsaturated polyester resin composition as in Example 2 were mixed for 15 minutes in a shear mixer and after adding to the mixture the aforesaid resin composition, the resulting mixture was mixed thoroughly for 5 minutes in a shear mixer. The mixture was placed in a glass bottle followed by sealing, stored in a chamber of 25° C., and the variation of the viscosity was measured in the same manner as in Example 2, the results are shown in FIG. 4 and FIG. 5. FIG. 4 is a graph showing the results of adding the resin composition prepared by using magnesium oxide having an iodine number of 38 mg./g. Curve (1) of FIG. 4 stands for the case of adding 1 part by weight of the resin composition, Curve (2) stands for the case of adding 2 parts by weight of the resin composition, Curve (3) stands for the case of adding 3 parts by weight of the resin composition, and Curve (4) stands for the case of adding 4 parts by weight of the resin composition. FIG. 5 is a graph showing the results of adding the resin composition prepared by using magnesium hydroxide having an iodine number of 25 mg./g. Curve (1) stands for the case of adding 2 parts by weight of the resin composition, Curve (2) stands for the case of adding 6 parts by weight of the resin composition, Curve (3) stands for the case of adding 10 parts by weight of the resin composition, and Curve (4) stands for the case of adding 12 parts by weight of the resin composition.

As shown in FIG. 4 and FIG. 5, the equilibrium viscosity can be increased by increasing the amount of the resin composition of this invention to be added, but at the same time the initial viscosity is also increased.

COMPARATIVE EXAMPLE 1

Figure 6:
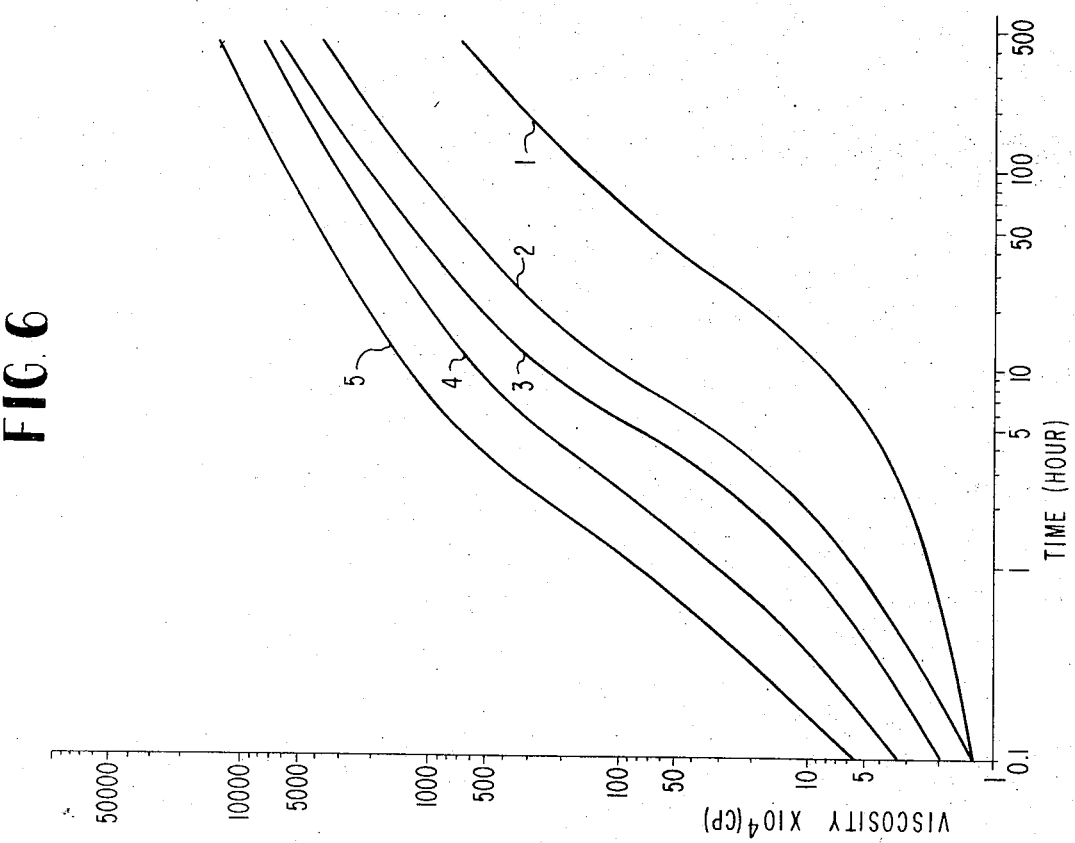
Figure 7:
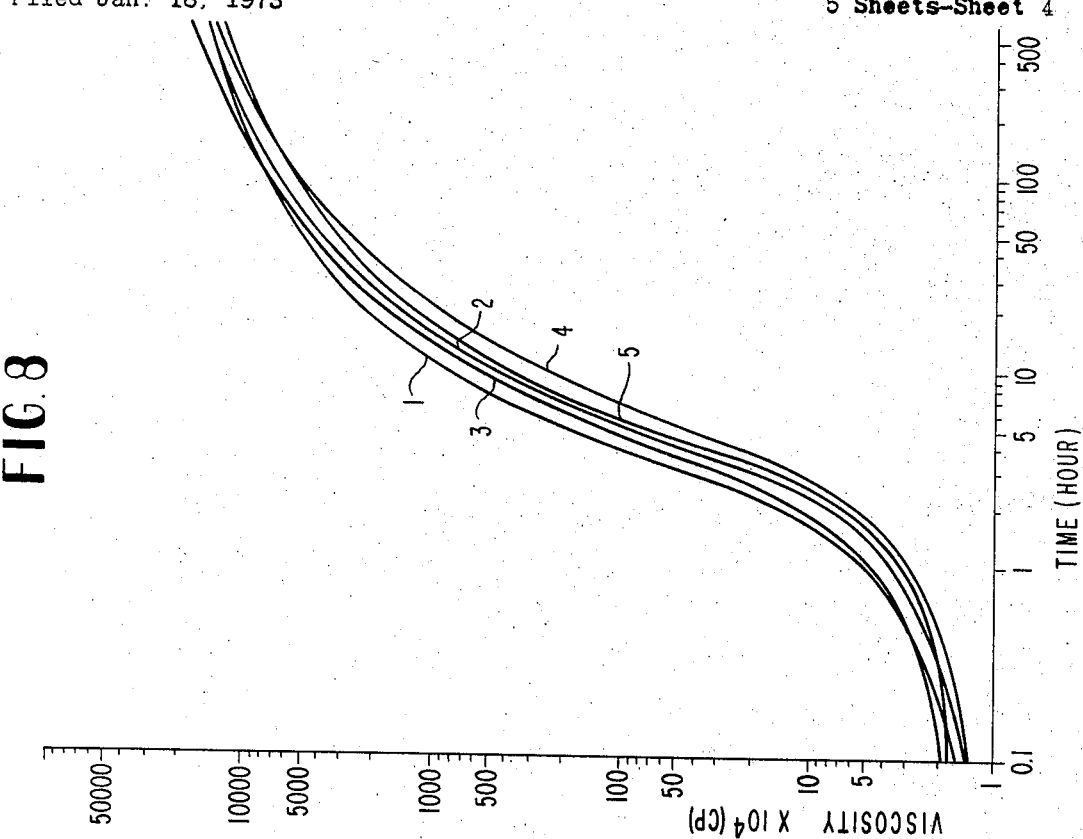

Magnesium oxide or magnesium hydroxide was added to the unsaturated polyester resin composition as a powder without producing a composition as above, and the thickening effect of the resin composition was observed. That is, 30 parts of the component (a), 70 parts of the component (b), and 100 parts of the component (c) as used in Example 2 for producing the unsaturated polyester resin composition were mixed for 15 minutes in a shear mixer and after adding to the mixture a powder of magnesium oxide or a powder of magnesium hydroxide, the resulting mixture was mixed for 5 minutes. The mixture was placed in a glass bottle followed by sealing, the bottle was stored in a chamber of 25° C., and then the viscosity of the mixture was maesured in the same manner as in Example 2, the results are shown in FIG. 6 and FIG. 7. Curve (1) of FIG. 6 stands for the result of the thickening test when 1 part of a powder of magnesium oxide having an iodine number of 12 mg./g., Curve (2) stands for the case of adding magnesium oxide having an iodine number of 27 mg./g., Curve (3) stands for the case of adding magnesium oxide having an iodine number of 38 mg./g., Curve (4) stands for the case of adding magnesium oxide having an iodine number of 52 mg./g., and Curve (5) stands for the case of adding magnesium oxide having an iodine number of 70 mg./g. Also, FIG. 7 shows the results of the thickening test when 3 parts by weight of a powder of magnesium hydroxide was added to the unsaturated polyester resin composition. Curve (1) of FIG. 7 stands for the case of adding magnesium hydroxide having an iodine number of 12 mg./g., Curve (2) stands for the case of adding magnesium oxide having an iodine number of 25 mg./g., Curve (3) stands for the case of adding magnesium hydroxide having an iodine number of 40 mg./g., and Curve (4) stands for the case of adding magnesium hydroxide having an iodine number of 82 mg./g.

As shown in FIG. 6 and FIG. 7, when magnesium hydroxide is added in a powder form, thickening is more rapidly at the initial stage and thereafter is slower in comparison with the resin compositions of this invention shown in FIG. 2 to FIG. 5. In order to obtain the same degree of equilibrium viscosity as that of the resin composition of this invention, it would be necessary to use magnesium oxide or magnesium hydroxide having a considerably high iodine number. However, the use of such magnesium oxide or hydroxide would result in high initial viscosity and therefore the period of time required for wetting out well the reinforcing fibers with the resin can not be obtained.

Example 4

The difference in thickening between the case of adding the resin composition of this invention to the unsaturated polyester resin composition and the base of adding a powder of magnesium oxide to the same polyester resin composition was evaluated by the following tests.

That is, preparing 60 parts by weight of a resin produced by dissolving 30 parts by weight of a polystyrene resin having a molecular weight of about 300,000 in 70 parts by weight of styrene, adding 40 parts by weight of magnesium oxide having an iodine number of 27 mg./g. to the solution, and mixing the mixture for 20 minutes by means of a mixer, a paste-like resin composition having a viscosity of 38,000 centipoise was obtained. Furthermore, by repeating the same procedure as above using magnesium oxide having also an iodine number of 27 mg./g., five paste-like resin compositions (1), (2), (3), (4), and (5) were prepared. Each of the resin compositions prepared above was added to the unsaturated polyester resin composition having the following formulation and then the thickening effect of the resin composition was observed.

The unsaturated polyester resin composition used in this test was prepared by mixing for 15 minutes in a shear mixer 40 parts by weight of a resin produced by dissolving 50 parts of a copolymer having a molecular weight of about 100,000 and composed of 60% methyl acrylate and 35% styrene in 50 parts of styrene, 60 parts by weight of a resin prepared by dissolving 60 parts of a polymer having an acid value of 50 produced by ester polymerization of 1.05 moles of propylene glycol and 1.0 mole of maleic anhydride in 40 parts of styrene, and 100 parts of a fine powder of calcium carbonate (SS–80, made by Nippo Funka Kogyo K.K.).

Figure 8:
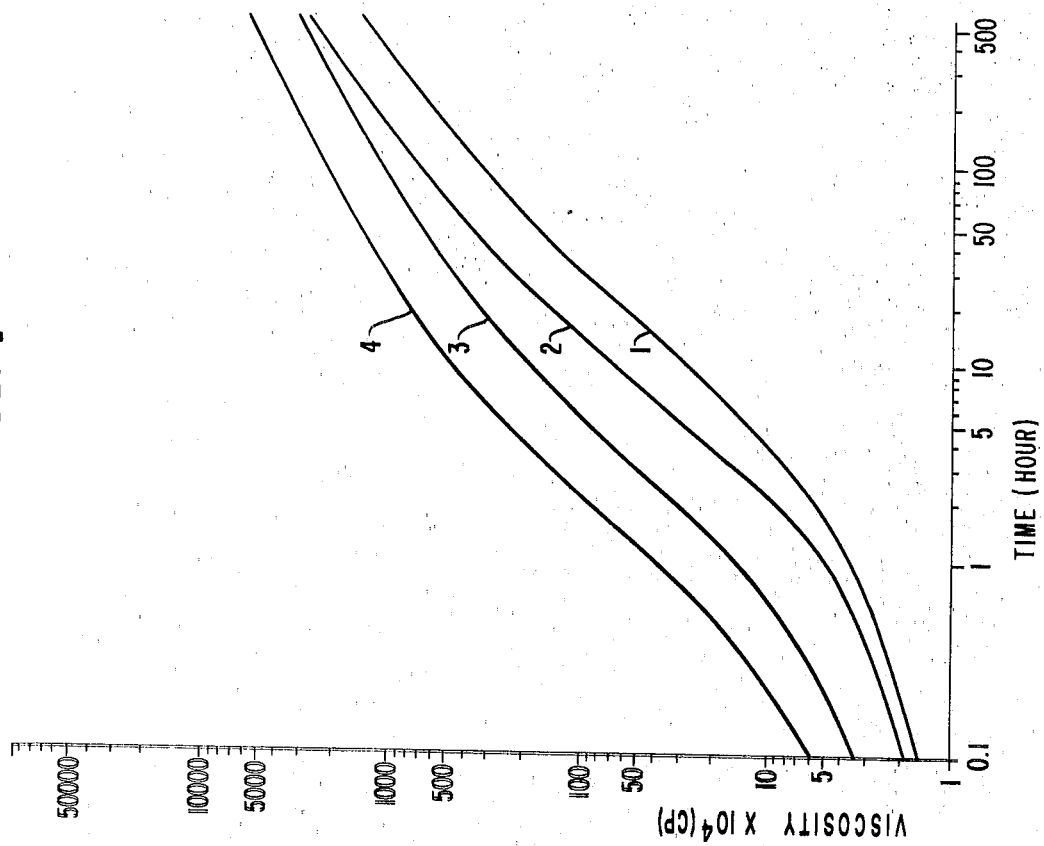

Then, 2.5 parts by weight of the resin composition prepared above using magnesium oxide having an iodine number of 27 mg./g. was added to the unsaturated polyester resin composition prepared above and after mixing the mixture for 5 minutes in a shear mixer, the resulting mixture was placed in a glass bottle followed by sealing. The bottle was stored in a chamber of 25° C. and then the change in the viscosity of the mixture was measured in the same manner as in Example 2, the results are shown in FIG. 8. Curves (1), (2), (3), (4), and (5) of FIG. 8 are the results obtained by measuring the viscosity of the unsaturated polyester resin composition when each of the five resin compositions (1), (2), (3), (4), and (5) respectively prepared above using magnesium oxide having an iodine number of 27 mg./g.

Figure 9:
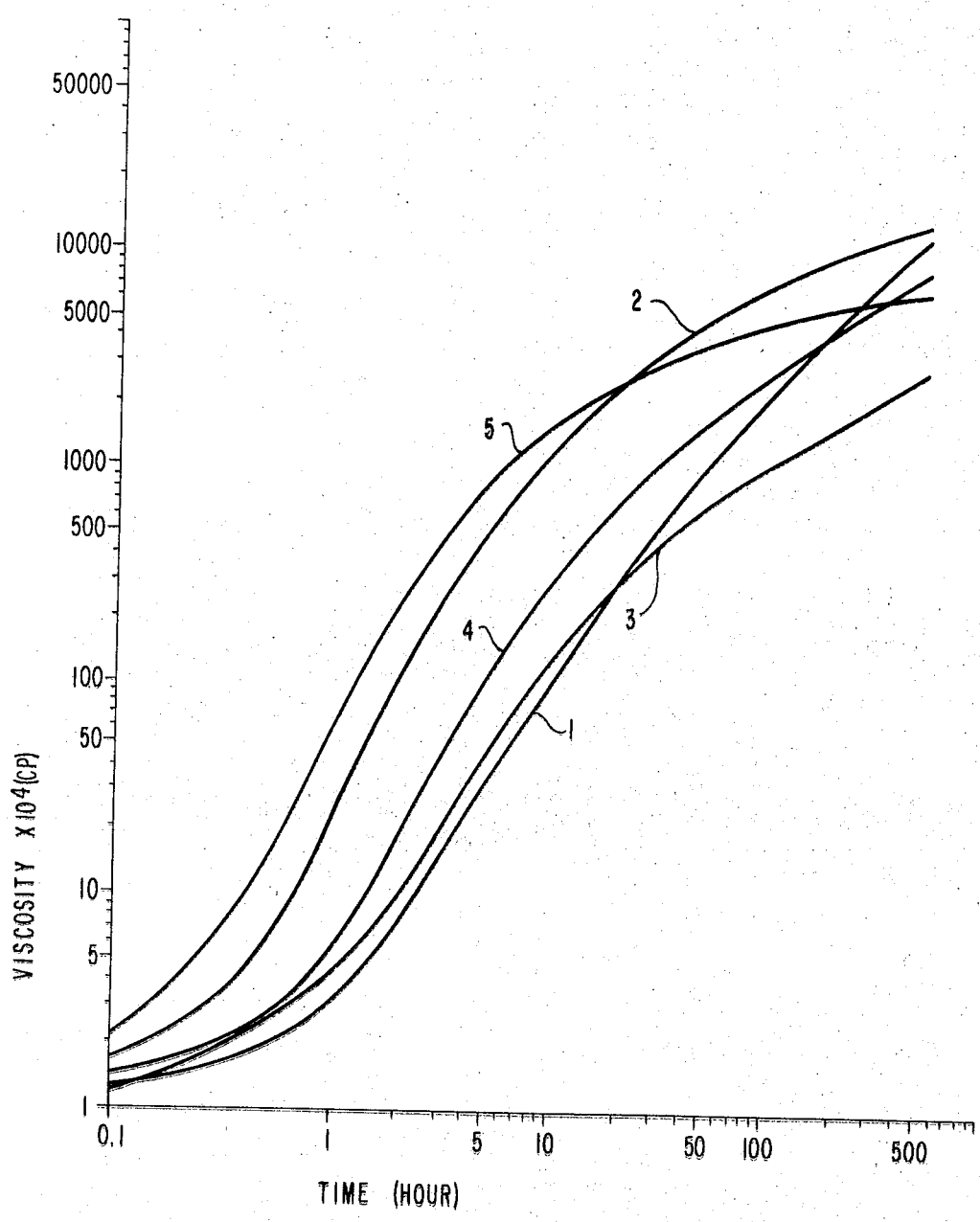

Then, 1 part by weight of a powder of magnesium oxide having an iodine number of 27 mg./g. was added to the unsaturated polyester resin composition having the same formulation as above and after mixing the mixture for 5 minutes in a shear mixer, the resulting mixture was placed in a glass bottle followed by sealing. The bottle was stored in a chamber of 25° C. and the change in the viscosity was measured in the same manner as in Example 2. The same thickening test as above was repeated five times and the results are shown in FIG. 9. That is, Curves (1), (2), (3), (4), and (5) of FIG. 9 stand for the results of the five repeated thickening tests by using a powder of magnesium oxide having an iodine number of 27 mg./g.

FIG. 8 and FIG. 9 indicate that the resin composition according to the present invention has an excellent reproducibility from the results of the test repeated five times.

While the invention has been described in detail and with reference to specific embodiments thereof, it will be apparent to one skilled in the art that various changes and modifications can be made therein without departing from the spirit and scope thereof.

What is claimed is:

1. A slurry-like, dope-like, or paste-like resin composition useful as a resin thickening agent comprising (a) 15–200 parts by weight of at least one of magnesium oxide having an iodine number of 10–50 mg./g. and magnesium hydroxide having an iodine number of 5–50 mg./g., (b) 100 parts by weight of a liquid monomer having polymerizable double bonds, and (c) 1 to 100 parts by weight of a thermoplastic addition polymer soluble in the monomer or (d) 20 to 300 parts by weight of a thermoplastic condensation polymer soluble in the monomer.

2. A slurry-like, dope-like, or paste-like resin composition useful as a resin thickening agent comprising (a) 15–200 parts by weight of at least one of magnesium oxide having an iodine number of 25–40 mg./g. and magnesium hydroxide having an iodine number of 10–30 mg./g., (b) 100 parts by weight of a liquid monomer having polymerizable double bonds, and (c) 1 to 100 parts by weight of a thermoplastic addition polymer soluble in the monomer or (d) 20 to 300 parts by weight of a thermoplastic condensation polymer soluble in the monomer.

3. The slurry-like, dope-like, or paste-like resin composition as claimed in Claim 1 wherein said liquid monomer having polymerizable double bonds is styrene, vinyltoluene, vinylbenzene, α-methylstyrene, α-ethylstyrene, t-butylstyrene, or a mixture thereof.

4. The slurry-like, dope-like, or paste-like resin composition as claimed in Claim 3 wherein said liquid styrenic monomer contains less than 50% by weight of a lower alkyl ester of acrylic acid, a lower alkyl ester of methacrylic acid, or 1,3-butanediol dimethacrylate.

5. The slurry-like, dope-like, or paste-like resin composition as claimed in Claim 1 wherein said thermoplastic addition polymer is a methyl methacrylate homopolymer, an ethyl methacrylate homopolymer, a methyl acrylate homopolymer, an ethyl acrylate homopolymer, a styrene homopolymer, a vinyltoluene homopolymer, a copolymer of methyl acrylate and a lower alkyl ester of acrylic acid, a copolymer of methyl methacrylate and a lower alkyl ester of methacrylic acid, a styrene-acrylonitrile copolymer, or a vinyl chloride-vinyl acetate copolymer.

6. The slurry-like, dope-like, or paste-like resin composition as claimed in Claim 1 wherein said thermoplastic addition polymer has a molecular weight of 10,000–10,000,000.

7. The slurry-like, dope-like, or paste-like resin composition as claimed in Claim 1 wherein said thermoplastic addition polymer has a molecular weight of 25,000–500,000.

8. The slurry-like, dope-like, or paste-like resin composition as claimed in Claim 1 wherein said resin composition contains 30–60 parts by weight of said thermoplastic addition polymer per 100 parts by weight of the liquid monomer having polymerizable double bonds.

9. The slurry-like, dope-like, or paste-like resin composition as claimed in Claim 1 wherein said thermoplastic condensation polymer soluble in the monomer is a saturated polyester resin having an acid value in the range of from 0.5 to 5.

10. The slurry-like, dope-like or paste-like resin composition as claimed in Claim 1 wherein said thermoplastic condensation polymer soluble in the monomer is a saturated polyester resin having an acid value in the range of from 1 to 3.

11. The slurry-like, dope-like, or paste-like resin composition as claimed in Claim 1 wherein said thermoplastic condensation polymer soluble in the monomer is a saturated polyester produced by the condensation polymerization of isophthalic acid, diethylene glycol and neopentyl glycol.

12. The slurry-like, dope-like, or paste-like resin composition as claimed in Claim 1 wherein said thermoplastic condensation polymer has a molecular weight in the range of from 5,000 to 30,000.

13. The slurry-like, dope-like, or paste-like resin composition as claimed in Claim 1 wherein said thermoplastic condensation polymer has a molecular weight in the range of from 5,000 to 30,000.

14. The slurry-like, dope-like, or paste-like resin composition as claimed in Claim 1 wherein said resin composition contains from 20 to 300 parts by weight of the thermoplastic condensation polymer per 100 parts by weight of the liquid monomer having polymerizable double bonds.

References Cited

UNITED STATES PATENTS 3,609,117   9/1971   Deis et al. _____ 260—40 R

T. DeBENEDICTIS, Sr., Assistant Examiner

ALLAN LIEBERMAN, Primary Examiner

U.S. Cl. X.R.

106—306; 260—41 B, 875, 881, 884, 885, 886